United States Patent Office 2,920,965
Patented Jan. 12, 1960

2,920,965
METHOD FOR PRODUCING CHEESE FLAVORED BAKED GOODS

Homer F. Ziegler, Jr., Glendale, John T. Watson, St. Louis, and Robert D. Seeley, Webster Groves, Mo., assignors to Anheuser-Busch, Incorporated, St. Louis, Mo., a corporation of Missouri No Drawing. Application September 23, 1957
Serial No. 685,384

2 Claims. (Cl. 99—90)

The present invention relates generally to the baking art and more particularly to novel cheese flavored baked goods.

In the known method of producing cheese crackers, cheese biscuits, cheese rolls, cheese pretzels and the like, aged or strong cheese is added to the dough so that after the product is baked, it has what is referred to in the trade as a cheese flavor.

It is known that prolonged heating of a cracker or the like which contains cheese, results in the loss of the cheese flavor unless the cheese is very intimately mixed with the cereal protein, and even then, too much heat can result in a poor or mild cheese flavor.

In addition, aged cheese is relatively expensive and sometimes is difficult to obtain.

It is an object of the present invention, therefore, to provide novel cheese flavored baked goods without using any cheese whatsoever, or with a relatively small amount of cheese. More particularly, it is an object to provide cheese flavored baked goods employing a readily available and relatively inexpensive ingredient, other than cheese.

Another object is to provide a method of producing cheese flavored baked goods wherein the heat normally employed in the baking of pretzels and the like does not adversely affect the cheese flavored properties of the goods.

A further object is to provide a cheese flavoring additive which can be used with either leavened or unleavened doughs.

We have learned that an excellent and lasting cheese flavor can be imparted to crackers, pretzels, pie shells and the like by adding to the dough prior to baking, a water soluble yeast digest, either alone or with a small amount of cheese, and baking the product with an intense crust-forming heat in the absence of excess moisture.

The yeast digest can be an autolysate or can be an enzyme hydrolysate. Furthermore, additional enzyme systems can be added to the autolysate in order to speed up or facilitate the autolysis.

We have found that other forms of yeast or types of yeast products do not produce the same result as the digest. Thus, ordinary dried yeast cells do not impart a cheese flavor to baked goods, and authough yeast digest together with the undigested fraction thereof provide a cheese flavor, the cheese flavor is not as strong on a pound for pound basis as when only yeast digest is used.

In producing the additive of the present invention, the yeast digest is separated from the undigested fraction, as by filtering, and the filtrate is dried to a powder. However, it is not necessary to reduce the filtrate to a powder because the filtrate can be used in liquid form; the main precaution is to remove the undigested portion of the cells if the maximum cheese flavor is desired.

Although it was at first considered that the cheese-like flavor may have been caused by a particular component of the yeast digest, e.g. leucine or cystine, it has been determined by experimentation that this is not correct. In like manner it has been determined that the protein hydrolysate of corn, casein, or the like does not produce the same result. Thus, an enzymatic hydrolysis of whole yeast (i.e. the protein carbohydrate and fat) produces a novel unexpected result, which, we believe, is due at least in part to the presence of purine, pyrimidine and nucleosides and nucleotides of purine and pyrimidine.

We have also learned that the moisture content of the product and the extent of heating has an important effect on the production of the cheese-like flavor in the baked goods. Thus, when the yeast digest is added to bread dough and the bread is baked in the normal manner the cheese-like flavor only appears in the crust. However when a slice of the bread is toasted, the cheese-like flavor is developed throughout the entire slice. It appears that the moisture content of bread which is normally in the neighborhood of 37% deters the formation of the cheese-like flavor, and that it is necessary to reduce the moisture content to below about 15%.

It is also advisable to bake the goods with an intense crust-forming heat in order to bring out the full cheese-like flavor; furthermore, less yeast digest is required in baked goods which are subjected to an intense heat, than is required in baked goods which are subjected to less heat. For example, less yeast digest is required in pretzels than is required in a biscuit or roll because the pretzel is subjected to more heat exposure per lb. of yeast digest contained in the dough.

The amount of yeast digest which is used is also important. Although 2% of yeast digest, based on the weight of flour, will give a definite and characteristic cheese baked flavor, 4% will produce a very definite strong pronounced cheese-like flavor. On the other hand, more than about 6% of the yeast digest causes an objectionable bitterness which tends to mask the cheese-like flavor. Light scorching or excessive browning brings out the same objectionable bitterness.

The yeast digest imparts a cheese-like flavor to the baked product both when used alone and when used with a small amount of cheese. It can also be used with either leavened or unleavened doughs. Table I below shows the effect of various amounts of yeast digest, based on the weight of flour used, in imparting a cheese flavor to cheese crackers, as compared with the flavor imparted by fresh Cheddar cheese alone. The cheese used in these tests was Kraft Old English process cheese (sharp).

TABLE I

| Supplement | Freshly Baked Cheese Flavor |
| --- | --- |
| 20% fresh Cheddar | mild. |
| 2% yeast digest, 6% Cheddar | moderately strong. |
| 4% yeast digest, 6% Cheddar | strong. |
| 2% yeast digest, 3% Cheddar | mild. |
| 4% yeast digest, 3% Cheddar | strong. |
| 2% yeast digest | mild. |
| 4% yeast digest | strong. |
| 6% yeast digest | too strong. |

Working examples of the present invention as applied to pretzels, crackers, pizza dough and pie crusts are given below only by way of illustration and not by way of limitation. If desired, these doughs may initially be prepared as dry prepared mixes to which water is added at the time the dough is prepared for baking. This invention is also embodied in preparations of such dried mixes in which the yeast digest is initially included or added thereafter to impart a cheese flavor even though the actual dough may be prepared and baked after the dry mix is sold. In the examples, it is understood that the parts of water and other ingredients may be varied within limits without departing from the invention.

Cheese pretzels

| | Parts |
|---|---|
| Flour | 100 |
| Water (variable) | 50 |
| Yeast | 1 |
| Salt | 1 |
| Diastatic syrup | 3.5 |
| Dextrose | 3.5 |
| Shortening | 10.0 |
| Yeast digest | 3.0 |
| Cheese color | To suit |

Mix dough fairly smooth.
Temperature 80° F.
Fermentation time approx. 20–30 min.

Make up in usual manner. Proof ¼ to ½ hour. Put on screens and place in boiling lye bath. When pretzels rise to surface, remove from bath, sprinkle with pretzel salt, allow to dry and then bake at 550° F.

Cheese crackers (sponge-dough process)

SPONGE

| | Grams |
|---|---|
| Cracker flour | 600 |
| Water (variable) | 375 |
| Yeast | 2.5 |
| Yeast food | 6.0 |
| Diastatic supplement | 7.5 |
| Hydrogenated shortening | 80.0 |
| Cheese color | To suit |

Mix 2 minutes low speed.
Temperature 72° F.
Time 20 hours.

DOUGH

| | |
|---|---|
| Cracker flour | 400 |
| Salt | 2.5 |
| Lard | 30.0 |
| Aged Cheddar cheese | 60.0 |
| Yeast digest | 30.0 |
| Diastatic supplement | 7.5 |
| Paprika | 2.0 |
| Red pepper | .2 |
| Soda (variable) | 6.0 |
| Water, 20 cc. to dissolve soda. | |

If desired, the yeast digest may be included in the sponge although it is usually included in the dough.

Mix 3½ min. low speed. Temperature 78°–80° F., floor time 2–3 hours. Run through sheeting roll of moulder twice, giving triple fold. Roll out to appropriate thickness, cut into squares, dock and salt.

Baking time varies depending upon type and design of oven. Brush or spray surface of baked crackers with melted coconut fat immediately upon discharge from oven.

Cheese-flavored pizza dough

| | Parts |
|---|---|
| Flour | 100 |
| Water (variable) | 64 |
| Corn oil | 7.0 |
| Yeast digest | 3.0 |
| Yeast | 4.0 |
| Salt | 2.0 |
| Baking powder | 0.5 |
| Diastatic supplement | 0.5 |

Dough temperature—78° F.
Fermentation time—2½ to 3 hrs.

Scale into individual units. Round up. Give about 15 minutes' intermediate proof. Run through head rolls of moulder with wide setting then sheet to desired thickness.

Cheese-flavored pie crust

| | Parts |
|---|---|
| Cake flour | 300 |
| Shortening | 200 |
| Salt | 6 |
| Water (variable) | 90 |
| Yeast digest | 18 |

Blend flour, yeast digest and salt. Cream ⅔ flour and shortening on low speed in mixer for one minute, add balance of flour and cream one minute more. Add water and mix until creamy—about 1½ minutes.

Reference was made hereinabove to the fact that leucine does not impart the same cheese-like flavor as does the years digest. This shown by the result of the following test.

Cheese crackers were made using applicants' yeast digest which contained approximately 4.3% leucine, and a leucine product which contained approximately 75% leucine, using the proportions shown in Table II. The crackers were submitted to a panel of nine tasters who were asked to rate the samples for strength of cheese flavor on the basis of a rating of (1) for weak flavor, (2) for mild flavor, (3) for moderate flavor, and (4) for full flavor.

TABLE II

| Supplement | Leucine Content, percent | Average Rating |
|---|---|---|
| 3% yeast digest | .129 | 3.0 |
| .172% leucine product | .129 | 1.2 |

Another test was made in which 6% Cheddar cheese was added to the yeast digest and to the leucine product, and the resultant crackers submitted to two taste panels, one of 11 tasters and the other of 10 tasters, the results are shown below.

TABLE III

| Supplement | Leucine Content, percent | Average Rating | |
|---|---|---|---|
| | | Panel of 11 | Panel of 10 |
| 3% yeast digest plus 6% Cheddar | .129 | 2.73 | 3.3 |
| .172% leucine product plus 6% Cheddar | .129 | 2.14 | 1.8 |

Thus, it is apparent that there has been provided a novel means for imparting a cheese flavor to baked goods without using cheese. The yeast digest is readily available and is relatively inexpensive and it imparts a cheese-like flavor to baked goods when used alone, or when used with a relatively small amount of cheese.

As indicated, the yeast digest may be added to a flour dough which is prepared by a baker, or it may be included in a prepared mix, or it may be added to a prepared mix. Such prepared mixes are sold in dry form and the desired amount of water is added to form the flour dough. As used herein, the term flour dough may refer to either the primary ingredient such as the flour dough made by a baker or it may refer to the dry form which contains flour and other components in the form of a prepared mix to which water is added to prepare the dough for baking.

It is to be understood that the foregoing description and examples have been given only by way of illustration, and that changes and alterations in the present disclosure, which will be readily apparent to one skilled in the art, are contemplated as within the scope of the present invention, which is limited only by the claims which follow.

What is claimed is:
1. The process of producing baked goods having a lasting cheese flavor comprising the steps of including in a flour dough between about 2 percent to about 6 percent enzymatic yeast digest based on the weight of flour and selected from the group consisting of yeast autolysates and enzymatic yeast hydrolysates, baking the dough with a crust-forming heat, and reducing the moisture content of the baked product below about 15 percent.

2. The process of producing baked goods having a lasting cheese flavor comprising the steps of including in a flour dough between about 2 percent to about 6 percent enzymatic yeast digest based on the weight of flour and selected from the group consisting of yeast autolysates and enzymatic yeast hydrolysates, baking the dough at a temperature of between about 350 F. and 550° F. and reducing the moisture content of the baked product below about 15 percent.

References Cited in the file of this patent

UNITED STATES PATENTS

| | | |
|---|---|---|
| 1,590,837 | Liebers | June 29, 1926 |
| 1,736,657 | Massatsch | Nov. 19, 1929 |
| 1,854,929 | Frey et al. | Apr. 19, 1932 |
| 1,908,512 | Heideman | May 9, 1933 |
| 2,564,763 | Kass | Aug. 21, 1951 |

OTHER REFERENCES

The Chemistry and Technology of Food and Food Products, 1951, 2nd ed., M. B. Jacobs, Interscience Publishers Inc. (New York), pp. 185, 205, 209 (vol. I), p. 1346 (vol. II).

Food Engineering, October 1954, page 52 relied on.